(12) United States Patent
Uchiyama

(10) Patent No.: US 9,064,675 B2
(45) Date of Patent: Jun. 23, 2015

(54) MICROCHANNEL PLATE AND PROCESS FOR PRODUCING THE SAME

(71) Applicant: HAMAMATSU PHOTONICS K.K., Hamamatsu-shi, Shizuoka (JP)

(72) Inventor: Toshiyuki Uchiyama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/790,788

(22) Filed: Mar. 8, 2013

(65) Prior Publication Data

US 2013/0193830 A1 Aug. 1, 2013

Related U.S. Application Data

(62) Division of application No. 11/662,179, filed as application No. PCT/JP2005/016922 on Sep. 14, 2005, now Pat. No. 8,402,791.

(30) Foreign Application Priority Data

Sep. 14, 2004 (JP) ................ P2004-267542

(51) Int. Cl.
*H01J 43/04* (2006.01)
*G02B 6/06* (2006.01)
*G02B 6/08* (2006.01)
*H01J 9/12* (2006.01)
*H01J 43/24* (2006.01)

(52) U.S. Cl.
CPC .............. *H01J 43/04* (2013.01); *G02B 6/065* (2013.01); *G02B 6/08* (2013.01); *H01J 9/12* (2013.01); *H01J 43/246* (2013.01)

(58) Field of Classification Search
CPC ........................................ H01J 43/04
See application file for complete search history.

(56) References Cited

U.S. PATENT DOCUMENTS

| 4,832,722 A | 5/1989 | Henderson |
| 4,853,020 A | 8/1989 | Sink |
| 5,015,909 A | 5/1991 | Zhong et al. |
| 5,223,013 A | 6/1993 | Cook et al. |

FOREIGN PATENT DOCUMENTS

| GB | 2119361 | 11/1983 |
| GB | 2181296 | 4/1987 |
| JP | 4-331741 | 11/1992 |
| WO | 00/02221 | 1/2000 |

*Primary Examiner* — Elmito Breval
(74) *Attorney, Agent, or Firm* — Drinker Biddle & Reath LLP

(57) ABSTRACT

A method of manufacturing microchannel plate according to an embodiment of the present invention includes: a first step of fabricating a multifiber having a polygonal cross-section by bundling a plurality of fibers; a second step of fabricating a microchannel plate base material by use of a plurality of the multifibers; and a third step of fabricating a microchannel plate out of the microchannel plate base material. The plurality of fibers include: a first fiber whose predetermined-thickness outer circumferential part surrounding a center part including a core is formed of a predetermined-component glass material; and a second fiber whose both center part including a core and outer circumferential part surrounding the same are formed of the predetermined-component glass material. The second fiber is arranged at, at least, one corner of a polygonal cross-section of the multifiber.

4 Claims, 6 Drawing Sheets

Fig.2
(a)
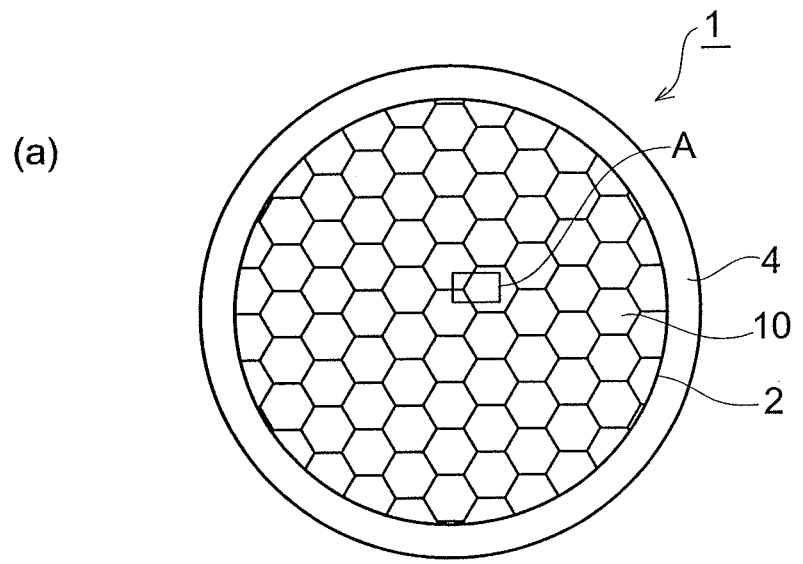
(b)
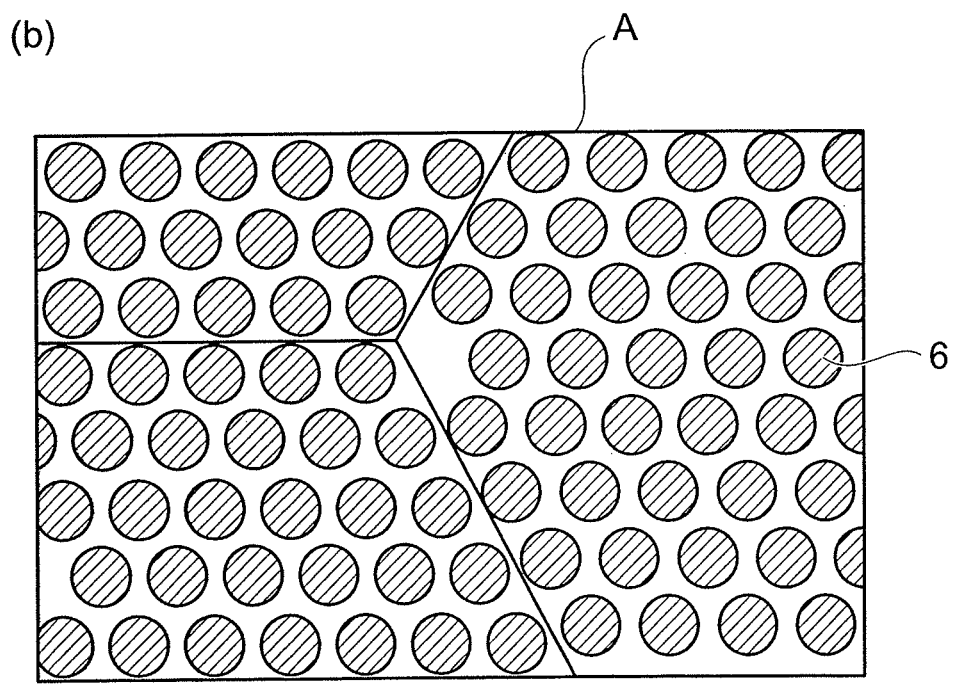

MICROCHANNEL PLATE AND PROCESS FOR PRODUCING THE SAME

This is a divisional application of copending application Ser. No. 11/662,179, having a §371 date of Aug. 23, 2007, which is a national stage filing based on PCT International Application No. PCT/JP2005/016922 filed on Sep. 14, 2005. The copending application Ser. No. 11/662,179 is incorporated by reference herein in its entirety.

TECHNICAL FIELD

The present invention relates to a microchannel plate used for a photomultiplier tube or the like and a manufacturing method thereof.

BACKGROUND ART

A microchannel plate has a plate-like structure and has a regularly arrayed structure of a plurality of channels. In recent years, due to expansion in the field of use, widening in the open area ratio and miniaturization of the channels have been required for microchannel plates. With the widening in the open area ratio and miniaturization, due to a misalignment (see FIG. 6) of hexagonal multifibers with each other at the time of manufacturing, a failure of a ring-like connection of channels with each other (a so-called missing wall phenomenon) and a breakage failure of channel walls (a so-called Rosetta phenomenon) easily occur at corners of multifibers adjacent with each other.

As conventional art for solving the above-described problems, disclosed in the specification of U.S. Pat. No. 4,431,694 is a method for preparing, when aligning a large number of standard fibers to fabricate a multifiber, a small number of special fibers having thicker cladding glass tube walls than those of the standard fibers and arranging these at corners of the hexagonal multifibers.

DISCLOSURE OF THE INVENTION

However, with this method, when miniaturization of channels is intended, the probability of occurrence of the missing wall phenomenon and Rosetta phenomenon increases during a process of fusion-bonding of the fibers to each other by heating and pressurization. Therefore, it is difficult to manufacture microchannel plates at a high yield. Moreover, with the structure described in Patent Document 1, a microchannel plate having high accuracy and high density cannot be realized.

An object of the present invention is to provide a method of manufacturing microchannel plate for which such problems have been solved and a microchannel plate allowing arraying of minute channels at high accuracy and high density.

A method of manufacturing microchannel plate according to the present invention includes: a first step of fabricating a multifiber having a polygonal cross-section by bundling a plurality of fibers and reducing the same in diameter; a second step of fabricating a microchannel plate base material by use of a plurality of the multifibers; and a third step of fabricating a microchannel plate by slicing the microchannel plate base material into flat plates, wherein the plurality of fibers bundled in the first step includes: a first fiber whose predetermined-thickness outer circumferential part surrounding a center part including a core is formed of a predetermined-component glass material; and a second fiber whose both center part including a core and outer circumferential part surrounding the same are formed of the predetermined-component glass material, and the second fiber is arranged at, at least, one corner of a polygonal cross-section of the multifiber.

According to this invention, a multifiber having a polygonal cross-section is constructed by bundling a first fiber whose outer circumferential part is formed of a predetermined-component glass material and a second fiber whose both center part and outer circumferential part are formed of the predetermined-component glass material, and the second fiber is arranged at, at least, one corner of the polygonal cross-section, so that a channel itself is not formed at this corner. Therefore, the second fiber acts as a dummy to increase the amount of the predetermined-component glass material at the corner, provides an effect of the corner to thicken a channel wall by the first fiber, and thus can reduce the probability of occurrence of a failure such as a missing wall phenomenon and a Rosetta phenomenon. And, although a reduction in the number of channels at the corner due to arrangement of the second fiber at the corner of the polygonal cross-section brings about a slight decline in luminance, this is negligible from a practical point of view when taking into consideration the fact that a problem of bright spots, an image defect, and the like due to a missing wall phenomenon and a Rosetta phenomenon can be solved.

In the method of manufacturing microchannel plate according to the present invention, it may be possible that the predetermined-component glass material has an insolubility in response to a predetermined-component solvent, the center part of the first fiber is formed of a glass material having solubility in response to the predetermined-component solvent, and the third step includes a step of exposing a sliced flat plate to the predetermined-component solvent.

In this manner, the thickness of the center part of the first fiber to be a channel becomes equivalent across the entire flat plate, so that the soluble glass material that forms the center part is uniformly removed at a high yield by exposing the flat plate to a predetermined-component solvent. Therefore, in comparison with the method of Patent Document 1 wherein a soluble glass material thinly remains at the corner of a multifiber, it becomes possible to fabricate a further miniaturized microchannel plate.

Moreover, in the method of manufacturing microchannel plate according the present invention, it is preferable that the first step is a step of fabricating a multifiber having a hexagonal cross-section. In this manner, channels of a microchannel plate can be most closely aligned, so that the channels occupy a large area, and the microchannel plate can be improved in sensitivity.

Furthermore, in the first step of the method of manufacturing microchannel plate according to the present invention, it is preferable that the second fiber is arranged at adjacent two corners, two corners excluding a neighbor, two corners located symmetrically, four corners excluding corners located symmetrically, four corners excluding adjacent corners, or all corners of the hexagonal cross-section of the multifiber. In this manner, after a plurality of multifibers are aligned, the number of second fibers in a corner region between adjacent multifibers is uniformized, so that the probability of occurrence of a failure is uniformly reduced in all corner regions.

A microchannel plate according to the present invention is a microchannel plate including: a glass effective portion for which a plurality of channels are formed; and a glass rim portion surrounding the effective portion, the microchannel plate being shaped in a flat-plate form, wherein the effective portion is constructed by arranging multifiber portions each formed by bundling a plurality of channels in a polygonal shape, without a gap so that corners thereof are adjacent to each other, and the number of channels per unit area in a corner region where the corners are adjacent to each other is smaller than the number of channels per unit area in a peripheral region of the corner region. The effective portion has a plurality of multifiber portions each formed by bundling a plurality of channels in a polygonal shape so as to have a plurality of corners, each of the plurality of multifiber portions being arrayed so as to form a corner region where a corner thereof and a corner of another adjacent multifiber portion of the plurality of multifiber portions are adjacent to each other. A number of the channels per unit area in the corner region is smaller than a number of the channels per unit area in a peripheral region of the corner region.

According to the present invention, since the number of channels per unit area in the corner region is smaller than the number of channels per unit area in the peripheral region of the corner region, the channel walls are relatively thickened. Therefore, failures such that the channels are connected to each other are reduced in the corner region, so that this rarely causes a failure of bright spots, an image defect, and the like. Moreover, a decline in luminance of the corner area due to the relatively thickened channel walls does not have a great influence on the image quality as a whole in use of the microchannel plate.

In the microchannel plate according to the present invention, it is desirable that an inside diameter of the channels in the corner region is equivalent to an inside diameter of the channels in the peripheral region of the corner region. With such a microchannel plate, since the channel inside diameter is equivalent between the channels in the corner region and the channels in the peripheral region thereof, the concentration of residual gas accumulated in the channel is comparable between the corner region and the peripheral region thereof when using the microchannel plate as a vacuum tube component or the like. Therefore, no problem that occurrence of bright spots or the like due to an electrical discharge, ion feedback, or the like is concentrated in the corner region occurs. Moreover, gas venting before the microchannel plate is used as a vacuum tube component or the like is also carried out equally to the respective channels. Therefore, since there is no such failure that production of residual gas particularly increases in channels of the corner region, occurrence of bright spots or the like in the corner region due to an electrical discharge, ion feedback, or the like is rare.

BRIEF DESCRIPTION OF THE DRAWINGS

FIG. 2 are views of the MCP of FIG. 1 observed from the front.

BEST MODES FOR CARRYING OUT THE INVENTION

Hereinafter, preferred embodiments of the present invention will be described in detail with reference to the accompanying drawings. Here, in the description of the drawings, identical or equivalent elements are designated with identical numerical symbols so as to avoid overlapping descriptions. Moreover, in the description of embodiments, a microchannel plate is referred to as an "MCP," and a multifiber, as an "MF", abbreviated, respectively.

First, a structure of an MCP according to the present embodiment will be described with use of FIG. 1 to FIG. 2. Here, a case of use of an MCP 1 having a circular cross-section is raised as an example.

Figure 1:
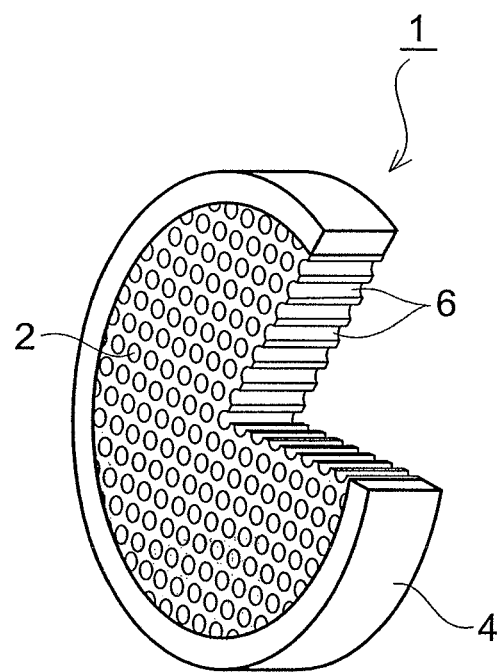
FIG. 1 is a perspective view showing a part of a structure of an MCP according to an embodiment.

FIG. 1 is a perspective view showing a structure of an MCP according to the present embodiment, wherein the MCP is schematically drawn with a part broken away. The MCP 1 is shaped in a disk-like form, and is comprised of a glass effective portion 2 having an electron multiplying function and a glass rim portion 4 surrounding the effective portion 2. In the effective portion 2, a plurality of channels 6 are two-dimensionally regularly arrayed. These channels 6 are holes having the same diameter and pass through in a plate thickness direction.

FIG. 2 shows a construction of the MCP 1 of FIG. 1 observed from the front. In FIG. 2(a), shown is a front view of the MCP 1 which is constructed by aligning, closely in a honeycomb shape, MFs 10 each formed by bundling a plurality of channels 6 in a hexagonal shape, and in FIG. 2(b), shown is an enlarged view of a region A in FIG. 2(a). As shown in FIG. 2(b), in a corner region where corners of three MFs 10 are adjacent to each other, since no channel exists at the, corner of one of the three MFs 10, the number of channels 6 per unit area of the corner region is smaller than the number of channels 6 per unit area in a peripheral region of the corner region. Therefore, a failure of a ring-like connection of the channels 6 in the corner region or breakage of channel walls is unlikely to occur. In this case, for the reason that the number of channels 6 per unit area of the corner region is smaller than that in the periphery, luminance in the corner region can possibly decline in use. However, in terms of the MCP 1 as a whole, the problem of a decline in luminance is almost negligible in comparison with a problem of bright spots, an image defect, and the like due to a missing wall phenomenon and a Rosetta phenomenon.

Moreover, as shown in FIG. 2(b), the inside diameter of the channels 6 located in the corner region is equivalent to the inside diameter of the channels 6 located in the peripheral region of the corner region. Therefore, even if residual gas is discharged from the channel wall into the channel when using the MCP as a vacuum tube component or the like, the concentration of residual gas accumulated in the channel is comparable between the corner region and the peripheral region thereof, so that a problem that occurrence of bright spots or the like due to an electrical discharge, ion feedback, or the like is concentrated in the corner region does not occur. Moreover, gas venting at the final stage of a manufacturing process of the MCP before this is used as a vacuum tube component or the like is also carried out to an equal extent therebetween since the respective channels in the corner region and the peripheral region thereof are equivalent in inside diameter. Therefore, there is no failure that occurs in the MCP disclosed in the specification of U.S. Pat. No. 4,431,694, such that production of residual gas particularly increases in channels of the corner region, so that occurrence of bright spots or the like in the corner region due to an electrical discharge, ion feedback, or the like is rare.

Figure 3:
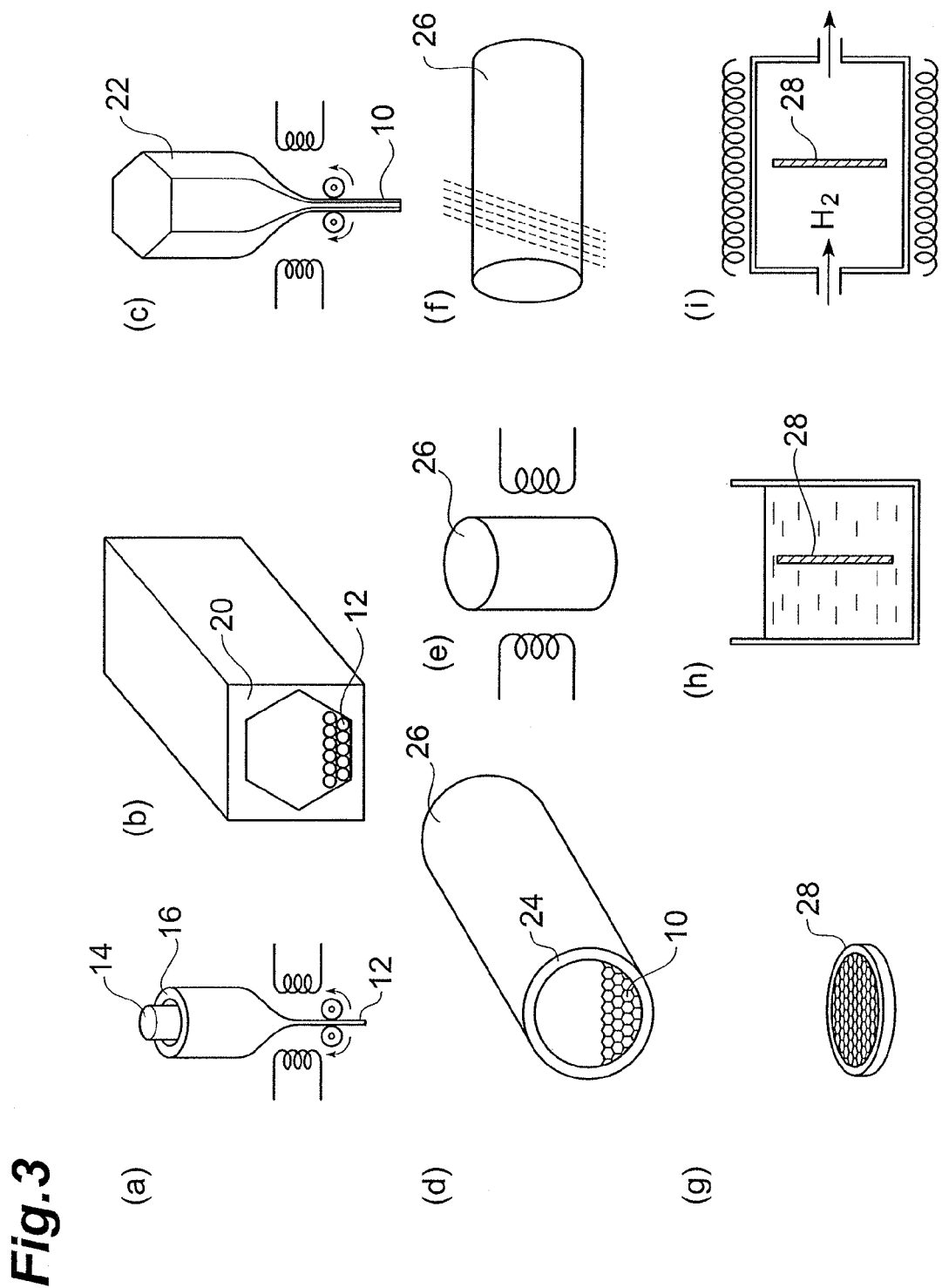
FIG. 3 is a process drawing showing a manufacturing method of the MCP according to the embodiment.

Next, based on FIG. 3, a manufacturing method of the MCP 1 according to the present embodiment will be described. Here, a case of use of the MCP 1 having a circular cross-section, the MFs 10 each having a regular hexagonal cross-section, and an acid solvent (for example, $HNO_3$ or HCl) is raised as an example.

First, a manufacturing method of the MF 10 will be described. In FIG. 3(a), shown is a forming method of a channel fiber (first fiber) 12 for which the channel 6 is produced by a coring process. According to FIG. 3(a), the channel fiber 12 is obtained by inserting a core portion (center part) 14 formed of a first glass material having solubility in response to an acid into a clad portion (outer circumferential part) 16 formed of a second glass material having insolubility in response to the identical acid and then tube drawing while heating these. A dummy fiber (second fiber) 18 (unillustrated) is a column-shaped fiber obtained by using only the second glass material having insolubility and then, similar to the channel fiber 12, tube drawing while heating the same. The dummy fiber 18 is made of the glass material (predetermined-component glass material) insoluble to an acid at both its center part including the core and its predetermined-thickness outer circumferential part surrounding the same, however, as long as neither the center part nor the outer circumferential part is dissolved by an identical solvent, these may be made of different types of glass materials comprised of different constituent elements. Also, at the time of tube drawing, this is carried out so that the channel fiber 12 and the dummy fiber 18 become circular in cross-section.

Figure 4:
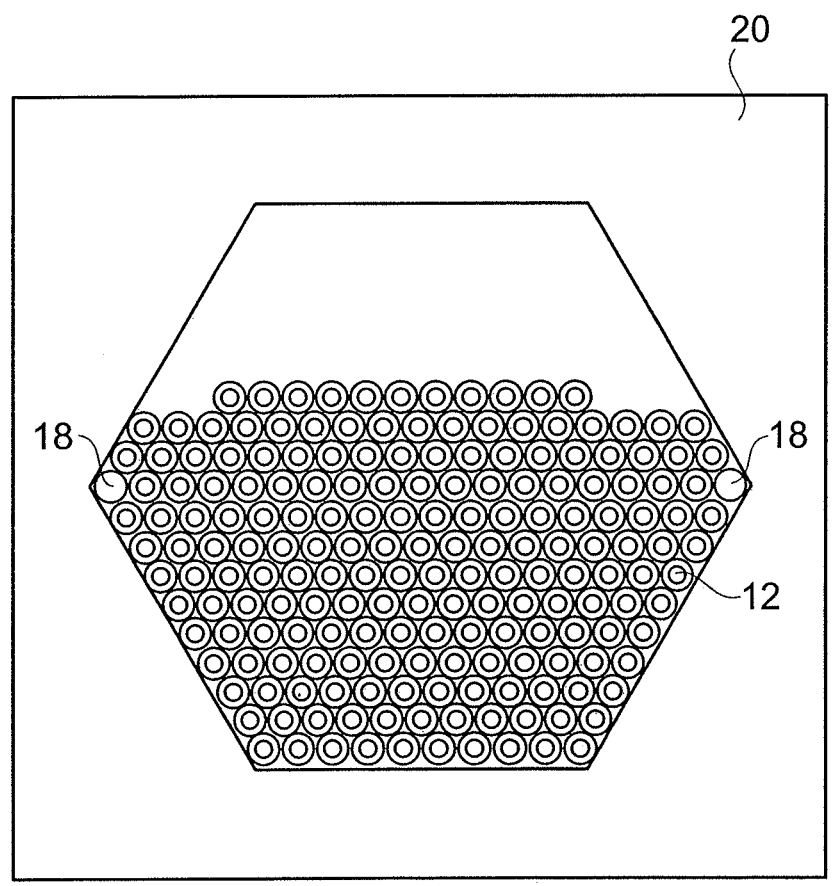
FIG. 4 is a plan view showing an arrangement of fibers in an MF formation.

Next, in a form 20 having a regular hexagonal hollow cross-section as shown in FIG. 3(b), the channel fibers 12 and the dummy fibers 18 are stacked up closely in parallel in a predetermined pattern, for alignment. When aligning these, as shown in FIG. 4, the dummy fibers 18 are arranged one each, of the inner walls of the form 20, at two corners located symmetrically, and the channel fibers 12 are arranged throughout the other part. Thereafter, the channel fibers 12 and dummy fibers 18 aligned in the frame 20 are fusion-bonded by heating and cooled, and then the frame 20 is removed, thus an MF base material 22 having a regular hexagonal cross-section is obtained. Next, while heating the MF base material 22 as shown, in FIG. 3(c), tube drawing is again carried out to form the MF 10. At this time, the tube drawing is carried out so that a cross-section of the MF 10 becomes regular hexagonal. Here, furthermore, MFs obtained in this process that have been stacked up in a form, aligned, and tube drawn may be provided as the MF 10. Alternatively, this process may be repeated until a desired channel diameter is obtained.

Next, a fabrication method of the MCP 1 using a plurality of MFs 10 will be described.

Figure 5:
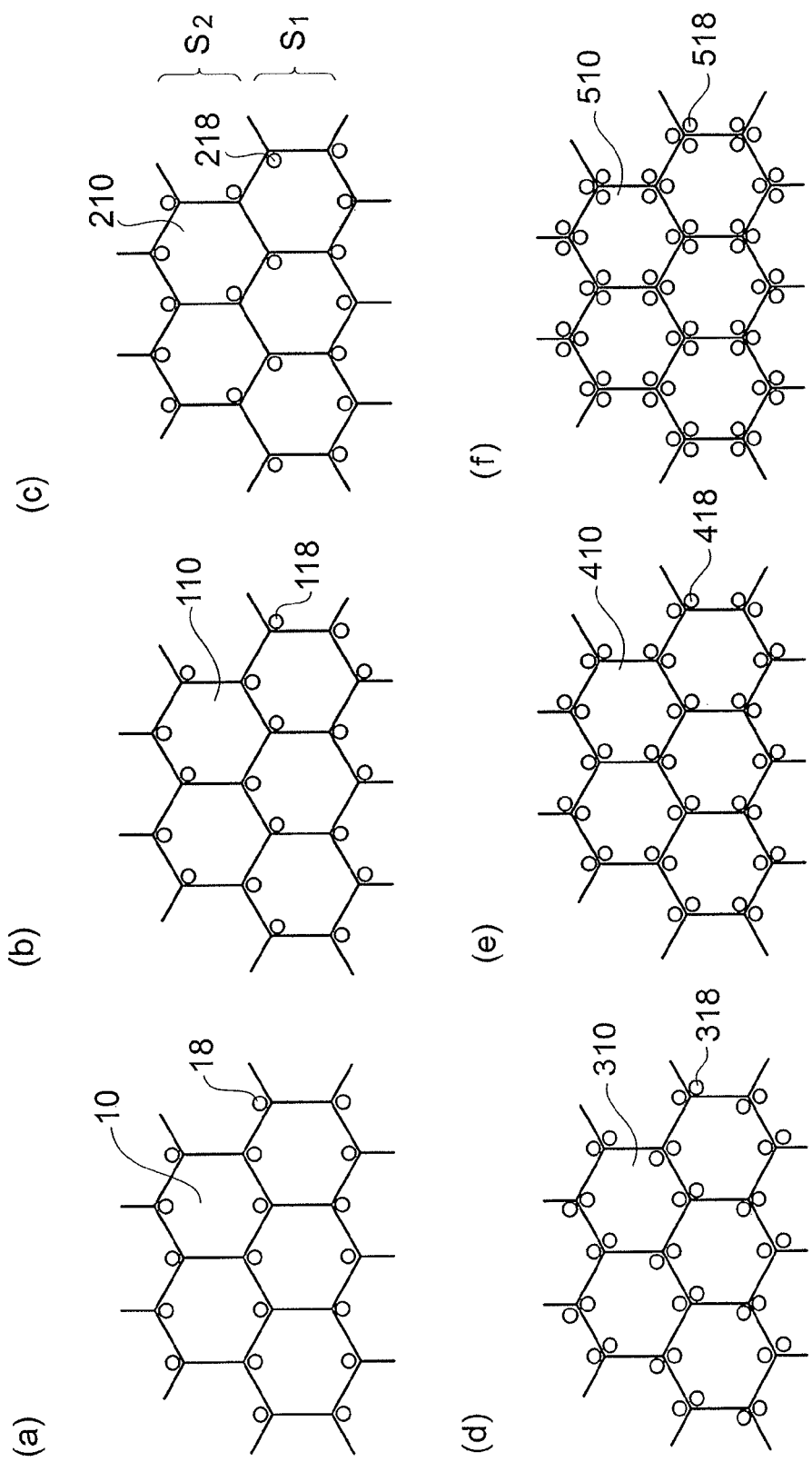
FIG. 5 is plan views showing other examples of a dummy fiber arrangement and an MF alignment pattern.
Figure 6:
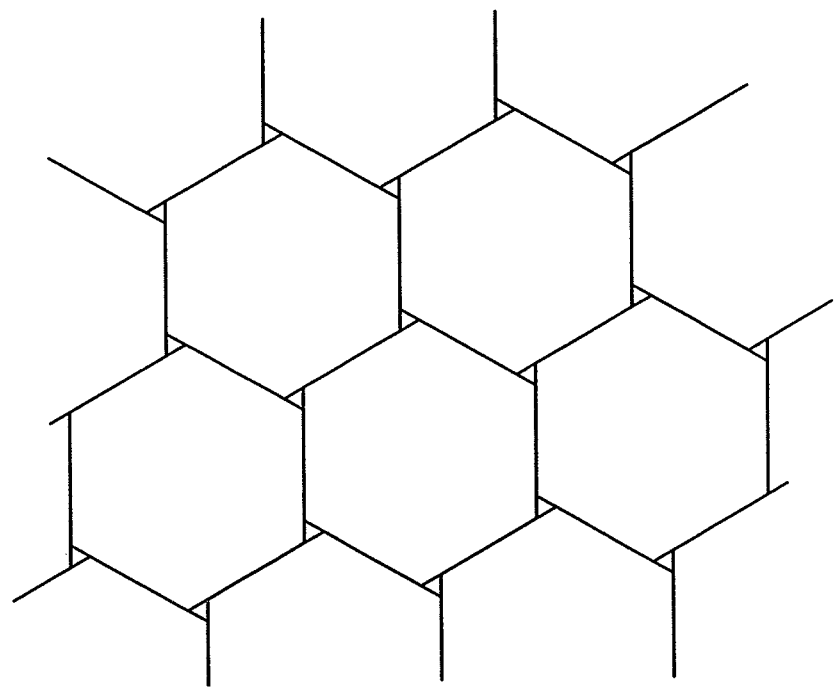
FIG. 6 is a plan view showing a misaligned condition of regular hexagonal MFs with each other.

First, as shown in FIG. 3(d), a plurality of the obtained MFs 10 are aligned inside a glass tube 24. At this time, in terms of all MFs 10, the MFs 10 are closely aligned so that symmetrical lines each connecting two corners having the dummy fibers 18 are parallel with each other as shown in FIG. 5(a). In this manner, one dummy fiber 18 is arranged in every corner region, and the channel fibers 12 are arranged throughout the peripheral region thereof, so that an increase in the area of an insensitive part of the MCP 1 can be suppressed to a minimum.

Next, by fusion-bonding by heating while pressurizing the plurality of MFs 10 aligned inside the glass tube 24, an MCP base material 26 is obtained (see FIG. 3(e)). Thereafter, by slicing the MCP base material 26 at a predetermined thickness and a predetermined angle and applying thereto a surface polishing as shown in FIGS. 3(f) and (g), an MCP plate material 28 is obtained.

Next, as shown in FIG. 3(h), the MCP plate material 28 is dipped in an acid solution, so as to carry out a coring process. At this time, the core portion 14 of the channel fiber 12 is eluted since this has been formed of the first glass material having solubility in response to an acid. On the other hand, the clad portion 16 and the dummy fiber 18 are not eluted since these are formed of the first glass material having solubility in response to the acid. Therefore, the channel 6 is formed as a result of elution of the core portion 14. Here, since the diameter of the core portion 14 is equivalent between the corner region and the peripheral region thereof, the present invention is superior to the art disclosed in the specification of U.S. Pat. No. 4,431,694 in a point that the first glass material is equivalently eluted, so that a so-called "uneven elution" does not occur.

Next, the MCP plate material 28 applied with a coring process is placed in an electric furnace with a hydrogen atmosphere and heated so as to carry out a reduction process (see FIG. 3(i)). Thereby, PbO on the surface of the channels 6 of the MCP plate material 28 is reduced to Pb, so that a desired conductive thin film is formed. At this time as well, since the channel inside diameter of the channels is equivalent between the corner region and peripheral region thereof, a homogeneous conductive thin film is formed. Lastly, on both surfaces of the MCP plate material 28, a metal for an electrode is evaporated (unillustrated), thus the MCP 1 is obtained.

According to the present embodiment, when aligning and fusion-bonding the MFs 10, even when the MFs 10 are misaligned with each other, since the dummy fibers 18 have been arranged one each at two corners located symmetrically of the corners of a regular hexagonal cross-section of the MF 10, no such a condition that the channels 6 are connected to each other in a ring-like form occurs, thus it becomes possible to prevent occurrence of a missing wall phenomenon or a Rosetta phenomenon. Moreover, since only one dummy fiber 18 has been arranged in the corner region comprised of three adjacent corners, reduction in the number of channels 6 is minimized, whereby an adverse effect on an image and the like resulting from an increase in the area of the insensitive part of the MCP 1 can be suppressed to a minimum. Furthermore, since the channels 6 in the corner region are the same in the hole diameter as the channels 6 in the peripheral region of the corner region, production of residual gas never occurs in the channels 6 at the time of gas venting, so that occurrence of poor characteristics such as bright spots, an electrical discharge, and ion feedback can be prevented.

Moreover, with regard to a dummy fiber arrangement in MFs and an MF alignment pattern, patterns as shown in FIG. 5(b) to (f) can be mentioned. MCPs 1 fabricated in these patterns by the same manufacturing method as in the above-described embodiment provide the same effects as those in the above-described embodiment (FIG. 5(a)).

In the following, dummy fiber arrangements and MF alignment in the patterns shown in FIG. 5(b) to (f) will be described. However, description of the manufacturing method will be omitted since this is identical to that in the above-described embodiment.

As shown in FIG. 5(b), such a construction may be employed that dummy fibers 118 are arranged one each at any two adjacent corners of the six corners in an MF 110 having a regular hexagonal cross-section, and no dummy fibers 118 are arranged at the other four corners. When aligning the MFs 110, as shown in FIG. 5(b), all MFs 110 are aligned so that symmetrical lines each connecting two corners arranged with no dummy fibers 118 are parallel with each other and, in terms of these symmetrical lines, the sides having the dummy fibers 118 are arranged in the same direction. In this manner, one dummy fiber 118 is arranged in every corner region, and channel fibers are arranged throughout the peripheral region thereof.

As shown in FIG. 5(c), such a construction may be employed that dummy fibers 218 are arranged one each at two corners excluding a neighbor of the six corners in an MF 210 having a regular hexagonal cross-section, and no dummy fibers 218 are arranged at the other corners. That is, such a construction may be employed that dummy fibers 218 are arranged at two corners arranged in order with one corner therebetween of the six corners in an MF 210 having a regular hexagonal cross-section, and no dummy fibers are arranged at the other four corners.

When aligning the MFs 210, as shown in FIG. 5(c), the MFs 210 located in a layer S1 are aligned so that symmetrical lines each connecting two corners having no dummy fibers 218 are parallel with each other and the sides having the dummy fibers 218 are arranged on the same side. The MFs 210 located in a layer S2 are rotated by 180 degrees from the MFs 210 located in the layer S1 for alignment. The layer S1 and the layer S2 are stacked up alternately. That is, as shown in FIG. 5(c), a plurality of MFs 210 are aligned so as to form a honeycomb shape for which the row S1 and the row S2 are alternately provided. The MFs 210 contained in the row S1 are arranged so that the sides having the dummy fibers 218 are oriented in the same direction, and the MFs 210 contained in the row S2 are arranged so that the sides having the dummy fibers 218 are inverted by 180 degrees relative to the row S1. In this manner, one dummy fiber 218 is arranged in every adjacent corner region, and channel fibers are arranged throughout the peripheral region thereof.

As shown in FIG. 5(d), such a construction may be employed that dummy fibers 318 are arranged one each at four corners excluding two symmetrical corners of the six corners in an MF 310 having a regular hexagonal cross-section. When aligning the MFs 310, as shown in FIG. 5(d), all MFs 310 are aligned so that symmetrical lines each connecting two corners arranged with no dummy fibers 318 are parallel with each other. In this manner, two dummy fibers 318 are arranged in every adjacent corner region, and channel fibers are arranged throughout the peripheral region thereof.

As shown in FIG. 5(e), such a construction may be employed that dummy fibers 418 are arranged one each at four corners excluding adjacent two corners of the six corners in an MF 410 having a regular hexagonal cross-section. When aligning the MFs 410, as shown in FIG. 5(e), all MFs 410 are aligned so that symmetrical lines each connecting two corners arranged with the dummy fibers 418 are parallel with each other. In this manner, two dummy fibers 418 are arranged in every adjacent corner region, and channel fibers are arranged throughout the peripheral region thereof.

As shown in FIG. 5(f), such a construction may be employed that dummy fibers 518 are arranged one each at all six corners in an MF 510 having a regular hexagonal cross-section. When aligning the MFs 510, those are closely piled up for alignment as shown in FIG. 5(f). In this manner, three dummy fibers 518 are arranged in every adjacent corner region, and channel fibers are arranged throughout the peripheral region thereof.

However, the present invention is not limited to the above-described embodiment. For example, in the present embodiment, although the cross-section of the MCP 1 has been provided in a circular form, this may be quadrangular or the like. In the present embodiment, although the acid solvent has been used, the solvent is not limited to this. A solvent other than acid may be used as long as the solvent dissolves the first glass material and does not dissolve the second glass material.

Moreover, in the above-described embodiment, although the frame 20 having a regular hexagonal hollow cross-section has been used when aligning the MFs 10, one having a hollow cross-section in a hexagonal shape whose two opposed sides are long, a triangular shape, or a quadrangular shape may be used. A regular hexagonal shape is particularly preferable in terms of arraying MFs minutely and closely.

Moreover, it is not always necessary that the dummy fiber arrangement and MF alignment are in the patterns as shown in FIG. 5(a) to (f). It is preferable that one, two, or three dummy fibers are arranged in the corner region.

INDUSTRIAL APPLICABILITY

According to the present invention, a microchannel plate capable of preventing the occurrence of a missing wall phenomenon and a Rosetta phenomenon and a manufacturing method thereof can be provided.

The invention claimed is:

1. A microchannel plate comprising:
a glass effective portion having a first surface and a second surface opposing the first surface;
a plurality of holes provided in the glass effective portion in order to form channels, each of the plurality of holes passing through the glass effective portion from the first surface to the second surface; and
a glass rim portion surrounding a side surface of the effective portion, the side surface being located between the first surface and the second surface,
the microchannel plate being shaped in a flat-plate form, wherein the effective portion consists of a plurality of polygonal glass portions each having a polygonal cross-sectional shape so as to have a plurality of corners, each of the plurality of polygonal glass portions being arrayed so as to form a corner region where a corner thereof and a corner of another adjacent polygonal glass portion of the plurality of polygonal glass portions are adjacent to each other, and
wherein, in the effective portion, a number of the holes per unit area in the corner region is smaller than a number of the holes per unit area in a peripheral region of the corner region.

2. The microchannel plate according to claim 1, wherein an inside diameter of the holes in the corner region is equivalent to an inside diameter of the holes in the peripheral region of the corner region.

3. A microchannel plate comprising:
a glass effective portion having a first surface and a second surface opposing the first surface;
a plurality of holes provided in the glass effective portion in order to form channels, each of the plurality of holes passing through the glass effective portion from the first surface to the second surface; and
a glass rim portion surrounding a side surface of the effective portion, the side surface being located between the first surface and the second surface,
the microchannel plate being shaped in a flat-plate form, wherein the effective portion consists of a plurality of polygonal glass portions each having a polygonal cross-sectional shape so as to have a plurality of corners, each of the plurality of polygonal glass portions being arrayed so as to form a corner region where a corner thereof and a corner of another adjacent polygonal glass portion of the plurality of polygonal glass portions are adjacent to each other,
wherein the plurality of polygonal glass portions includes at least one polygonal glass portion in which each side of the polygonal cross-sectional shape thereof is in contact with a different polygonal glass portion, and wherein, in the one polygonal glass portion, a number of the holes per unit area in the corner region including one corner of the polygonal cross-sectional shape of the one polygonal glass portion is smaller than a number of the holes per unit area in a central portion including a center of the polygonal cross-sectional shape of the one polygonal glass portion.

4. The microchannel plate according to claim 3, wherein an inside diameter of the holes in the corner region is equivalent to an inside diameter of the holes in the central portion.

\* \* \* \* \*